(12) United States Patent
Loop et al.

(10) Patent No.: US 7,466,314 B2
(45) Date of Patent: Dec. 16, 2008

(54) RESOLUTION-INDEPENDENT SURFACE RENDERING USING PROGRAMMABLE GRAPHICS HARDWARE

(75) Inventors: Charles T. Loop, Bellevue, WA (US); James Frederick Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 11/261,071

(22) Filed: Oct. 27, 2005

(65) Prior Publication Data

US 2007/0097121 A1 May 3, 2007

(51) Int. Cl.
*G06T 17/00* (2006.01)
(52) U.S. Cl. ......................... 345/428; 345/419; 345/420
(58) Field of Classification Search ................ 345/419, 345/426, 428, 420
See application file for complete search history.

(56) References Cited

U.S. PATENT DOCUMENTS 6,362,820 B1 * 3/2002 Hoppe ........................ 345/423

OTHER PUBLICATIONS

Bajaj et al. "Modeling with Cubic A-Patches", ACM 1995, pp. 103-133.*
Zhang et al. "3D tetrahedron ray tracing", IEEE 2001, pp. 334-335.*
Heckbert, Paul S., "The Mathematics of Quadric Surface Rendering and *SOID*", New York Institute of Technology, 3-D Technical Memo 4, Jul. 13, 1984, pp. 1-21.

* cited by examiner

*Primary Examiner*—Kimbinh T Nguyen
(74) *Attorney, Agent, or Firm*—Klarquist Sparkman, LLP (57) ABSTRACT

Surfaces defined by a Bézier tetrahedron, and in particular quadric surfaces, are rendered on programmable graphics hardware. Pixels are rendered through triangular sides of the tetrahedra and locations on the shapes, as well as surface normals for lighting evaluations, are computed using pixel shader computations. Additionally, vertex shaders are used to aid interpolation over a small number of values as input to the pixel shaders. Through this, rendering of the surfaces is performed independently of viewing resolution, allowing for advanced level-of-detail management. By individually rendering tetrahedrally-defined surfaces which together form complex shapes, the complex shapes can be rendered in their entirety.

20 Claims, 10 Drawing Sheets

RESOLUTION-INDEPENDENT SURFACE RENDERING USING PROGRAMMABLE GRAPHICS HARDWARE

BACKGROUND

The evolution of graphics rendering technology has led to the development of procedural techniques for describing various steps in the rendering process. Procedural geometry is useful as a mechanism for producing arbitrarily complex geometry from compact descriptions. For a simple example, a cube object can be represented passively, as a polygonal representation comprising a list of eight vertexes and six sides. However, a more-compact procedural representation can be developed where the cube becomes the result of a cube-generating procedure, which needs as input only position coordinates and a size. In another example, curves can be described according to Bézier control points, allowing a complex path to be mathematically described with only a few data points. Thus, geometric procedures often provide a useful, compact way to represent shapes, avoiding the access and transfer of many points of data. More complex procedures, such as rotations or splines, offer even greater compression of data. Other processes, such as shading and texture also take advantage of procedural techniques. Indeed, programmable procedural shaders are seen by some as a most efficient way to tackle graphical rendering problems. Such processing maps well to a Single Instruction, Multiple Data ("SIMD") architecture; allowing hardware vendors to exploit parallelism and achieve high performance.

However, conventional graphics display or graphics processor unit ("GPU") architectures enforce a divide between procedural geometry and procedural appearance (such as procedural shaders and texture) by means of a processing chain that operates on fixed, passive polygonal primitives. A common approach is to relegate procedural geometry to the pre-rasterization stages, to expand the procedures into polygons, and to devote a large amount of bandwidth to feeding polygons to the transformation and setup stages of the graphics processor.

These limitations can lead to visible and undesirable artifacts and have constrained procedural advances from aiding in level-of-detail ("LOD") management. LOD management is needed to avoid under sampling, or tessellation, artifacts when a curved surface is viewed up close, and to avoid wasting resources, both temporal and spatial, when a densely triangulated surface is viewed from afar. These difficulties are especially prevalent when dealing with changes in resolution when zooming in on shapes.

As an example, consider rendering a surface which is rendered using a triangle mesh. One solution might be to densely sample the surface, forming many more smaller triangles and computing pixel color accordingly. An alternative might be to utilize a lower density mesh. While both of these approaches will work, the first will waste resources if the surface is viewed from a distance, and the second will introduce sampling artifacts under zoom.

SUMMARY

Techniques for rendering of procedurally-based surfaces allow for resolution-independent rendering of surfaces. For example, quadric surfaces are defined by Bézier tetrahedra, which each define a bounded convex surface. The surfaces can then be rendered in a piecemeal fashion per each tetrahedron. In one example the surfaces are rendered by tracing rays viewed through triangular sides of the tetrahedra to the surface, determining if the intersection of the ray and the surface is within the tetrahedron, and then computing a surface normal at the intersection for lighting evaluation. By performing this for multiple triangle sides, the entire visible surface can be rendered, and by performing this for multiple surfaces, complex surfaces can be rendered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

DETAILED DESCRIPTION

The following description relates to the rendering of surfaces by direct rendering of a curved primitive type. By rendering curved surfaces directly, as opposed to an approximating triangle mesh, the techniques described herein avoid tessellation artifacts and the need for LOD management. This provides for resolution-independent rendering, meaning that the curved elements of a surface can be viewed as curved independent of viewpoint.

In particular, the techniques described herein are focused on rendering of shapes described by second order trivariate Bézier tetrahedra. These shapes correspond to second order algebraic, or quadric surfaces in a Bernstein basis (also known as a Bézier basis) and are rendered on a piecewise fashion, per each tetrahedron. The rendering techniques are able to model piecewise smooth surfaces by taking advantage of this restriction to a bounded tetrahedron combined continuity conditions between adjacent tetrahedra.

1. GPU Architecture

Figure 1:
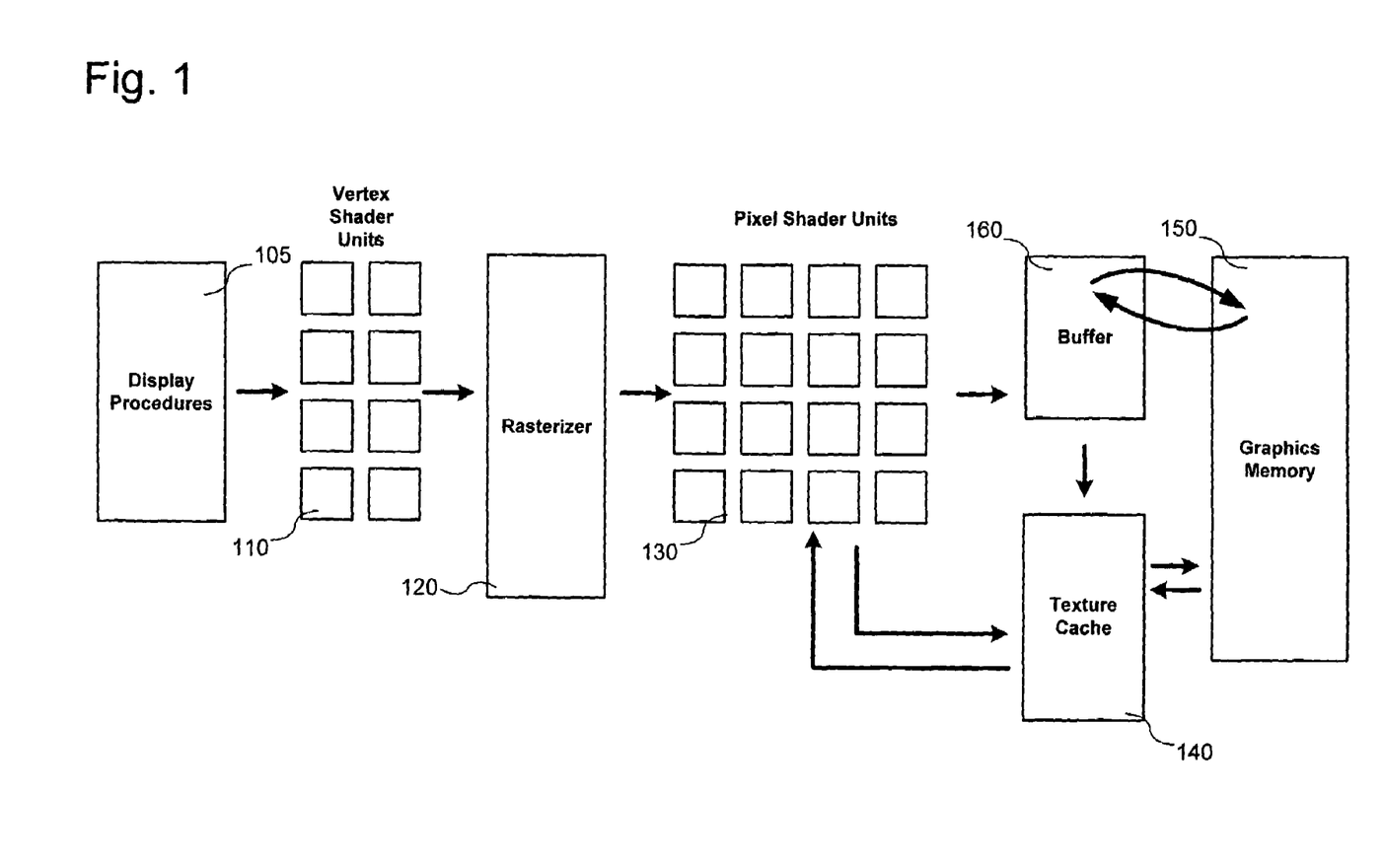
FIG. 1 is a block diagram of a graphics processing unit architecture.

The techniques described herein are implemented on a graphics processing unit. One example of a graphics processing unit is shown in FIG. 1, which illustrates a simplified overview of a traditional GPU architecture 100. In one implementation, the GPU architecture corresponds to the GPU 1015 illustrated in FIG. 10. Display data 105, which describes geometry of an image to be rendered, is input into programmable vertex shader units 110, which generate polygonal representations of the geometric forms. These geometric forms are then input into a rasterizer, which interpolates the polygons and samples them to develop a sample set of points in image space, which can then be shaded and have texture added to them. These points are then passed to a series of programmable pixel shader units 130 which utilize parallel computing techniques to perform shading of the points, as well as adding and manipulating textures. It is this ability to perform parallel computations as well as to manipulate textures which makes the GPU, and in particular the vertex shader and pixel shader units, a useful platform for computation of surface points. Pixel shader unit computation is frequently performed under the control of pixel shader programs, which are GPU-executable programs written to take advantage of the pixel shader units.

Textures, which can be pre-loaded into graphics memory 150 by a computer CPU before training, are cached in texture cache 140. In various implementations, textures can map directly to illustrated shapes, or can alternatively be used as canonical texture spaces, which are not necessarily directly tied to an image space. Once processing is complete, the image points can then be placed in a buffer 160 before being transferred to graphics memory 150. The buffer, in one implementation, comprises a frame buffer, which holds color values, as well as a z-buffer, which holds pixel depth values along the z-axis (which, as used herein, corresponds to the viewing direction). These buffers allow for resolution of hidden surfaces (e.g. what surfaces are in front of others.) Thus, when colors are computed by the pixel shader units, along with a depth along the z-axis for that color, the freshly-computed depth can be compared to a corresponding value in the z-buffer. Then, if the depth value is less than that in the z-buffer, the freshly-computed color is stored in the proper frame buffer location, if not, it is behind the color value already in the buffer, and is ignored. In an alternative implementation (not illustrated), the image points can be written to a buffer which is kept in the graphics memory in order to increase pixel-writing speed.

2. Examples of Quadric Surfaces

Figure 2:
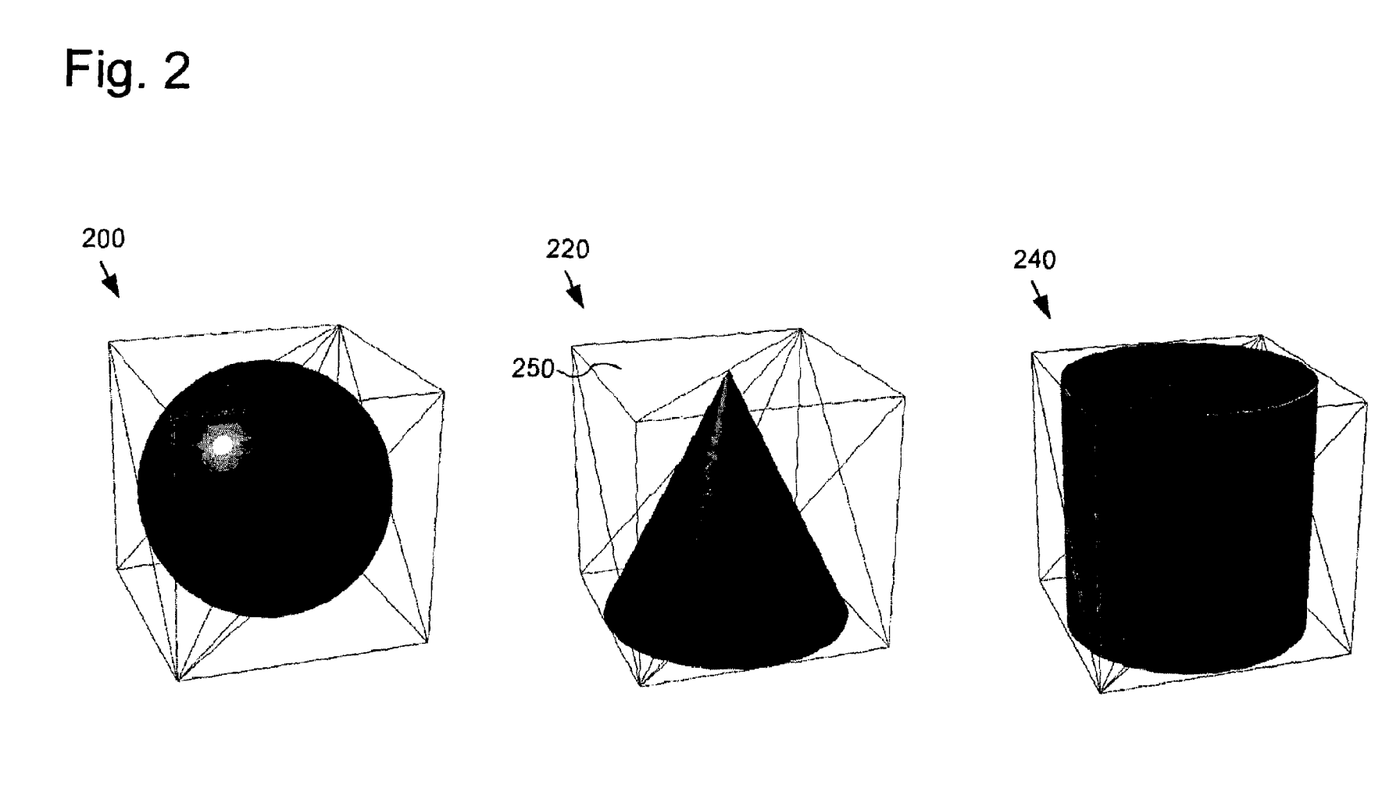
FIG. 2 illustrates examples of quadric surfaces.

FIG. 2 illustrates three examples, 200, 220, and 240 of quadric surfaces. Mathematically, a quadric surface is a second order algebraic surface given by the equation:

$$Q(x, y, z, 1) = xQx^T = 0 \quad (2.1)$$

where $x=[x\ y\ z\ 1]$ is a point (represented in homogenous form), and $$Q = \begin{bmatrix} q_{00} & q_{01} & q_{02} & q_{03} \\ q_{01} & q_{11} & q_{12} & q_{13} \\ q_{02} & q_{12} & q_{22} & q_{23} \\ q_{03} & q_{13} & q_{23} & q_{33} \end{bmatrix}$$

is a symmetric matrix. Typically, quadric surfaces are classified by considering various properties, such as rank, determinant, and eigenvalues of the coefficient matrix Q. Common quadric surfaces include the example sphere 200, cones 220, and cylinders 240, among others.

In general, a quadric surface represented by a coefficient matrix Q is not compact; it therefore may not be possible, for such a surface, to define a bounding box that contains all points satisfying Equation (2.1). In practice, it more useful to render some bounded portion of a quadric surface, rather than the entire surface. To accomplish this, we represent a quadric surface in tetrahedral form, where a surface is described by decomposing it into one or more tetrahedra. FIG. 2 thus illustrates the surfaces 200, 220 and 240 as bounded by cubes composed of six tetrahedra each (of which tetrahedron 250 is one example). Please note that the tetrahedra illustrated in FIG. 2 for each of the surfaces are merely examples and do not imply any particular limitations on dividing a surface among tetrahedra.

Figure 3A:
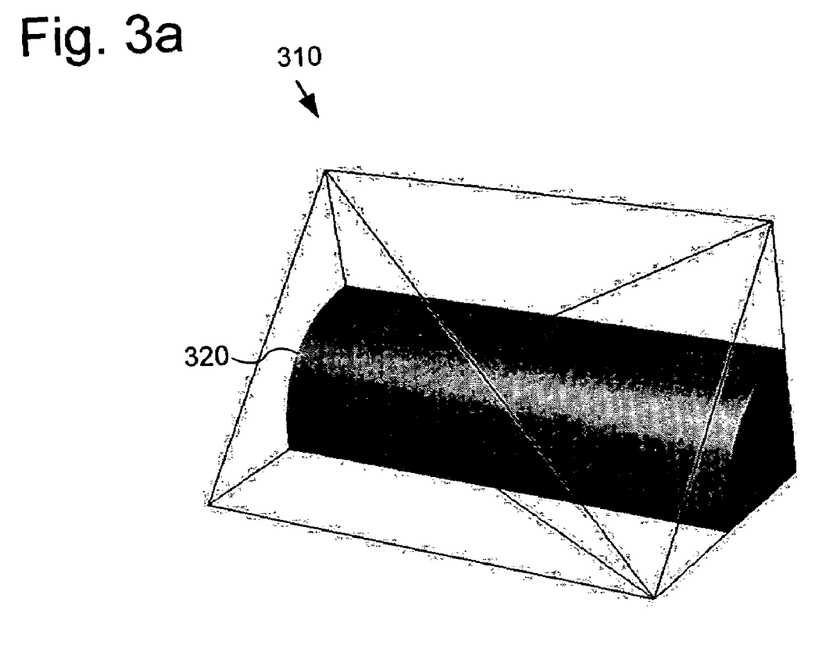
FIGS. 3a and 3b are examples illustrating dividing a surface into quadric surfaces.
Figure 3B:
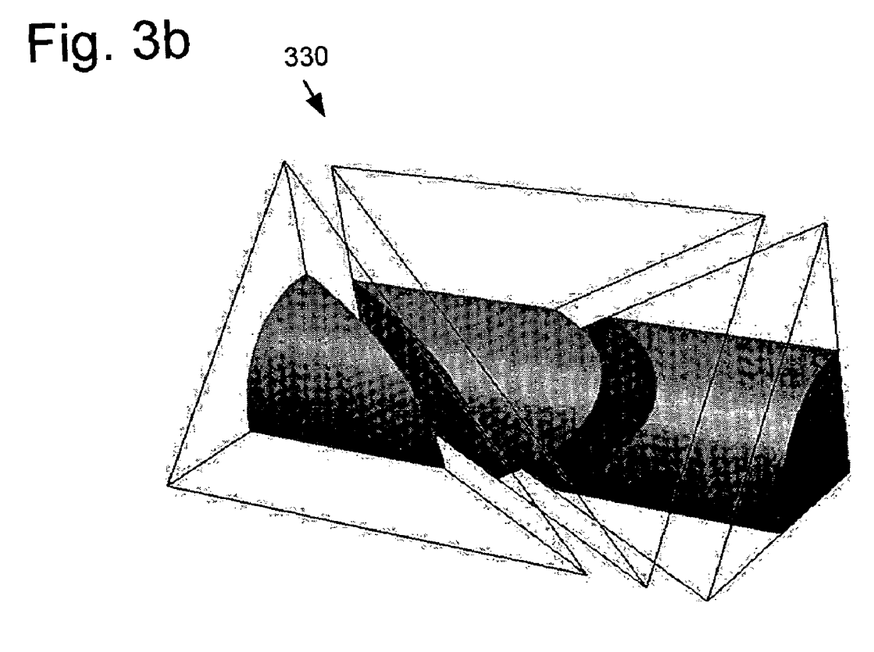

FIG. 3a illustrates another example 310 of a quadric surface 320 which, in FIG. 3b is divided into three tetrahedra in the expanded view 330. As FIGS. 3a and 3b illustrate, it is possible to divide up a quadric surface into multiple parts, each of which is bounded by the edges of a tetrahedron. Because the tetrahedra share common sides, and because the bounded surfaces can be defined to represent a contiguous surface over the tetrahedral boundaries, the entire surface appears whole when the three bounded surfaces are rendered together. FIGS. 3a and 3b also illustrate that the divided portions do not have to be similarly shaped or sized. It should be recognized that when rendering a quadric shape as the composition of a plurality of tetrahedra, the shape may be divided after definition according to a partitioning method, or the shape may be defined at the outset as a plurality of different quadric shapes, each bound in a tetrahedron, that are situated so as to appear to be a contiguous whole upon rendering.

3.1 Examples of Bézier Tetrahedra

The rendering techniques described herein take advantage of tetrahedra partitioning by representing quadric surfaces in Bézier tetrahedral form.

A Bézier tetrahedral form of a surface is defined within a tetrahedron. For example, if T is a tetrahedron with four vertices $v_i = [x_i\ y_i\ z_i\ 1]$ (for i=0, 1, 2, 3), T can be encoded in a matrix of the same name:

$$T = \begin{bmatrix} x_0 & y_0 & z_0 & 1 \\ x_1 & y_1 & z_1 & 1 \\ x_2 & y_2 & z_2 & 1 \\ x_3 & y_3 & z_3 & 1 \end{bmatrix}$$

Given such a T, a second order Bézier tetrahedron can be defined:

$$B(r_0, r_1, r_2, r_3) = rBr^T = 0 \quad (3.1)$$

where $r=[r_0\ r_1\ r_2\ r_3]$ are barycentric coordinates (meaning $r_0+r_1+r_2+r_3=1$) of point x with respect to T. This definition is given for a systemic matrix B of scalar-valued Bézier coefficients, or "weights":

$$B = \begin{bmatrix} b_{2000} & b_{1100} & b_{1010} & b_{1001} \\ b_{1100} & b_{0200} & b_{0110} & b_{0101} \\ b_{1010} & b_{0110} & b_{0020} & b_{0011} \\ b_{1001} & b_{0101} & b_{0011} & b_{0002} \end{bmatrix}$$

Figure 4A:
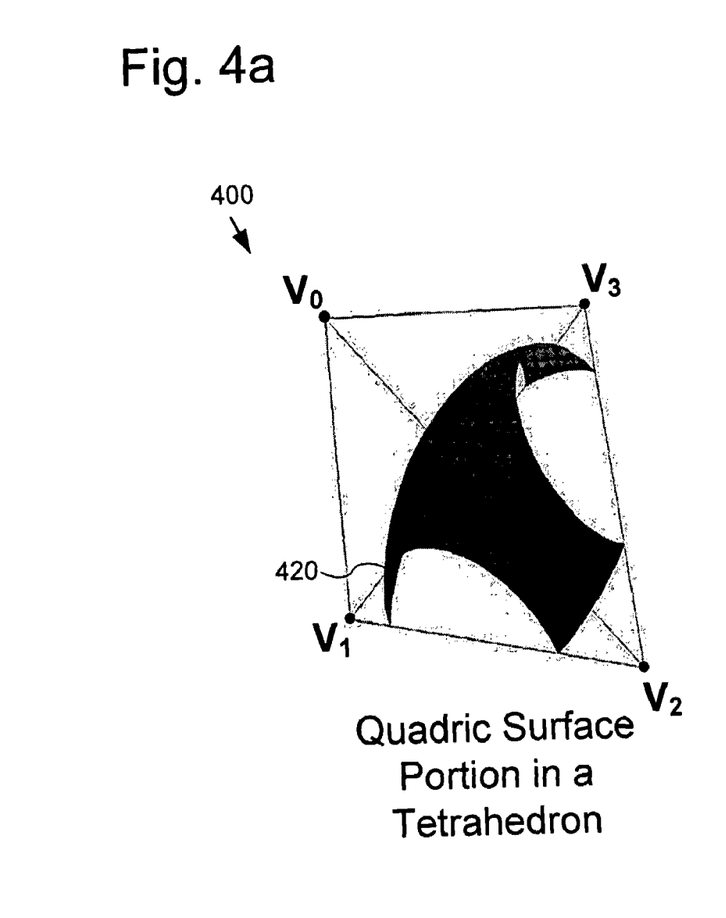
FIGS. 4a and 4b are examples of a quadric surface in a tetrahedron, and a representation of the surface as a set of Bézier weights in the tetrahedron.
Figure 4B:
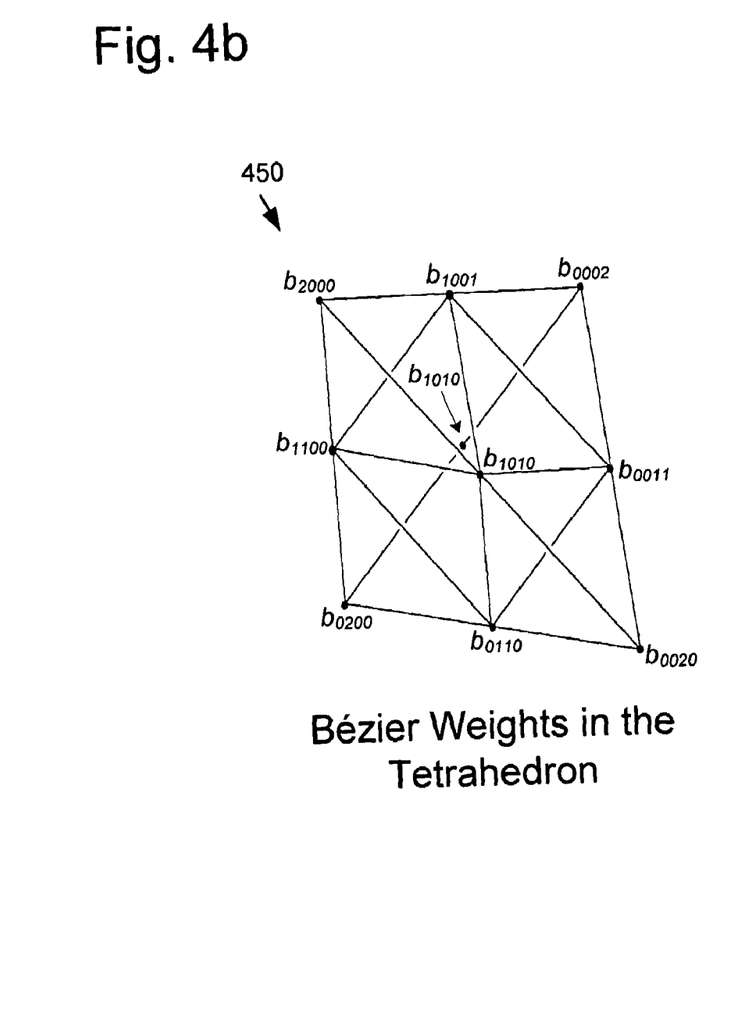

FIGS. 4a and 4b illustrate two examples of tetrahedra 400 and 450 for a given quadric shape 420. In FIG. 4a, the shape (which may be a bounded portion of a larger shape) is illustrated inside tetrahedron 400. Tetrahedron 400 is defined by the four vertices $V_0$, $V_1$, $V_2$, and $V_3$. Tetrahedron 450 is identical in size and shape to tetrahedron 400, but shows the Bézier weights (e.g. the coefficients in a matrix B) which define the shape 420, just as the shape of a quadric surface is determined by a coefficient matrix Q.

The advantage of using a Bézier tetrahedral form for shape rendering is that solutions $r_0, r_1, r_2, r_3 \in [0,1]$ are guaranteed to lie within the convex hull of tetrahedron T. This restriction of a quadric surface to a tetrahedral element has several benefits. For example, it has been shown that it is possible to state simple explicit continuity conditions between the weights of a pair of adjacent tetrahedra such that the composite surface is continuous or smooth. Dealing with tetrahedral elements in a graphics system also enables view frustum culling, as well as extent and interference testing.

The techniques described herein to render second order Bézier tetrahedra take advantage of the fact that a tetrahedron is a convex shape with four oriented triangular faces. Thus, in one implementation, the rendering techniques render each front facing triangle using vertex and pixel shaders programs to determine if the surface within the tetrahedron is visible from a pixel. If so, the techniques compute a normal vector, evaluate a lighting equation and determine the appropriate depth to use when writing to the buffer. These techniques are described in greater detail below.

3.2 Examples of Changing Forms Between Quadric Surfaces and Bézier Tetrahedra

Second order Bézier tetrahedra and quadric surfaces represent different bases for the same class of surfaces. Thus, it is useful during rendering to have compact forms for conversion between these two representations. Starting with a quadric surface defined by coefficient matrix Q, it is possible to then specify some tetrahedron T over which to define a Bézier tetrahedron. By definition, the barycentric coordinates r, of point x with respect to T, satisfy $x = rT$.

Given this, and provided that tetrahedron T is non-degenerate (e.g. it has volume), the barycentric coordinates r of point x with respect to T are found by $r = xT^{-1}$ Determining a conversion from quadric coefficients to Bézier weights proceeds as follows:

$xQx^T = 0$ $(rT)Q(T^T r^T) = 0$

And thus, $B = TQT^T$ (3.2)

Similarly, a reverse conversion can be obtained by starting with a Bézier tetrahedron:

$Q = T^{-1}BT^{-T}$ (3.3)

Thus, given a tetrahedron T and a Bézier weight matrix B, Equation (3.3) can be used to find a corresponding quadric coefficient matrix Q.

4. Examples of Surface Rendering Processes

Figure 5:
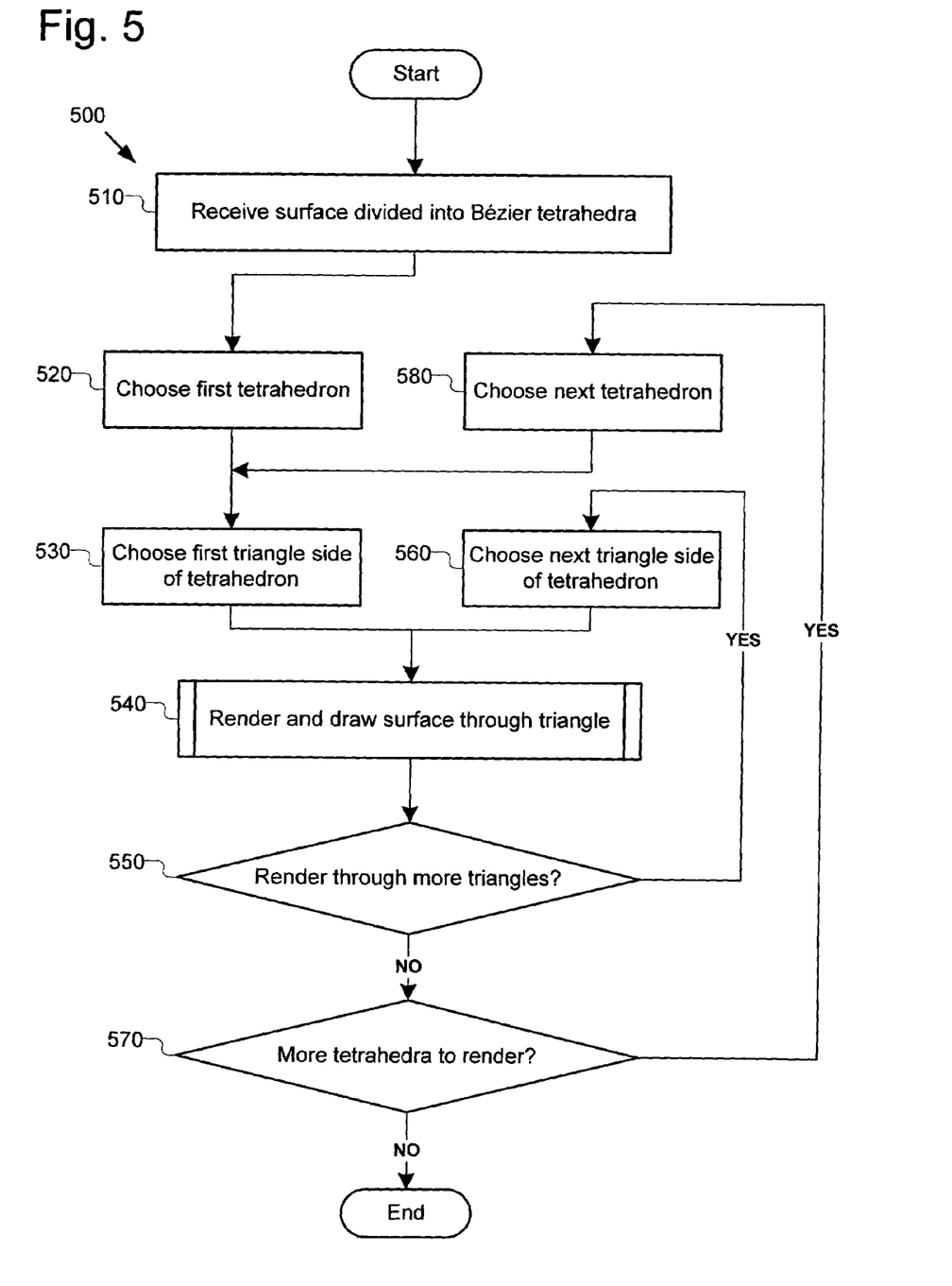
FIG. 5 is a flowchart illustrating an example process for rendering quadric surfaces.

FIG. 5 illustrates an example process 500 for rendering a quadric surface. In various implementations, blocks of process 500 may be combined, subdivided, or rearranged. In one implementation, process 500 may be performed by dividing tasks between a CPU and a GPU; in alternative implementations, a GPU may perform all tasks, or GPU functions may be emulated by a CPU. The process begins at block 510, where the surface is received for rendering divided into a set of Bézier tetrahedra. In one implementation, the process takes a complex quadric shape and divides the surface into the set of tetrahedra. In another, the surface is already divided before the point of rendering; in yet another, only a single surface is rendered.

Next, at block, 520, a first tetrahedron is chosen so that the surface bounded inside it may be rendered. In one implementation, the first tetrahedron may be chosen to be one that is further away from the eye point of a viewer than other tetrahedra. In another implementation, the tetrahedron may be chosen randomly or by other criteria. Next, a side of the tetrahedron is chosen so that rendering may take place through that side. Thus, a first triangle side of the tetrahedron is chosen at block 530. In one implementation, the triangle may be chosen because it is visible to a viewer. This criterion is particularly useful because, as is described below, the triangle is used to view the surface bounded by the tetrahedron and to see where viewing rays strike the surface. Thus, it is useful for such a viewing triangle to be visible to a viewer in order to reduce superfluous computation of non-viewable portions of the surface. In alternative implementations, however, non-visible triangles may be rendered, and so other criteria may be used when choosing the first triangle.

Next, at block 540 the section of the surface visible through the triangle is rendered and then drawn. The process performed at this block is described in greater detail below with respect to FIG. 6. Then, process 500 continues to decision block 550, where it is determined if there are additional triangles to render. If so, the process repeats at block 560 where another triangle side is chosen. If not, at decision block 570 it is determined whether there are additional tetrahedra to render. If so, the process repeats at block 580. If not, the process ends for the shape being rendered.

Figure 6:
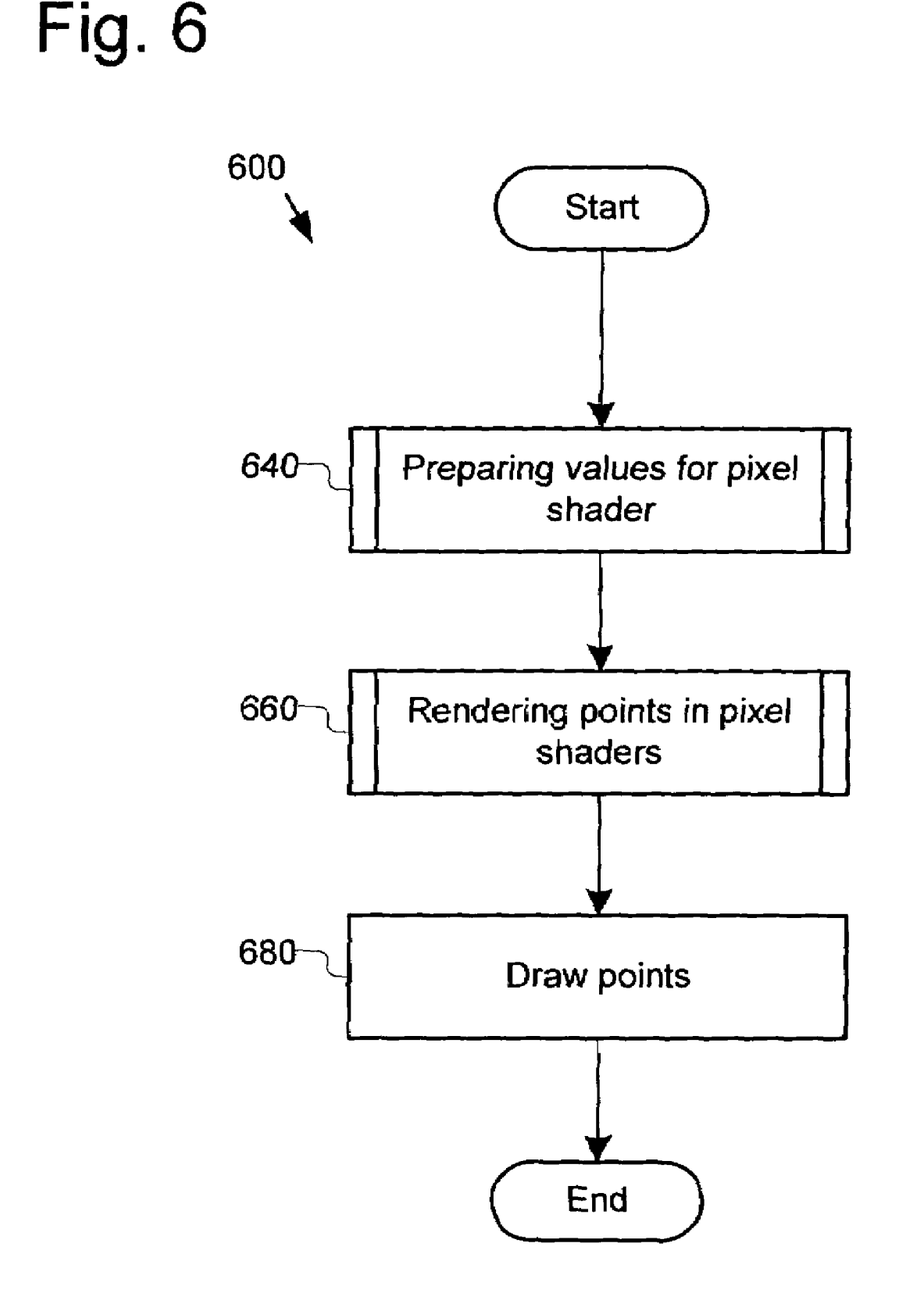
FIG. 6 is a flowchart illustrating an example process for rendering and drawing a portion of a surface viewed through a triangle of a tetrahedron.

FIG. 6 illustrates an example process 600 for rendering a quadric surface through a triangular side of a Bézier tetrahedron. In various implementations, blocks of process 600 may be combined, subdivided, or rearranged. In one implementation, process 600 may be performed by dividing tasks between a CPU and a GPU; in alternative implementations, a GPU may perform all tasks, or GPU functions may be emulated by a CPU. Particular examples of implementations of the process of FIG. 6 will be described below. It should be noted that while the pixel depth computed by a GPU would by default correspond to the plane containing the triangle, the implementations described herein utilize programming to compute pixel depth at the surface which is being rendered. The process starts at block 640, where values are prepared for rendering in the pixel shader units 130. In one implementation, the process of block 640 is performed by vertex shader units 110 in a GPU. In another the process of block 640 is performed by a combination of the vertex shader units 110 and the rasterizer 120. In yet another, it may be performed by a CPU. The process of block 640 is described in greater detail below with respect to FIG. 8. Next, at block 660, the points viewed through the viewing triangle are rendered by the pixel shader units. The process of block 660 is described in greater detail below with respect to FIG. 7. After the points have been rendered, at block 680, the points are drawn. In one implementation, this comprises writing the rendered pixels to a buffer for drawing on a screen. In another implementation, block 680 may additionally comprise projection of the pixels on a screen or otherwise producing the image. At this point, process 600 then ends.

Figure 7:
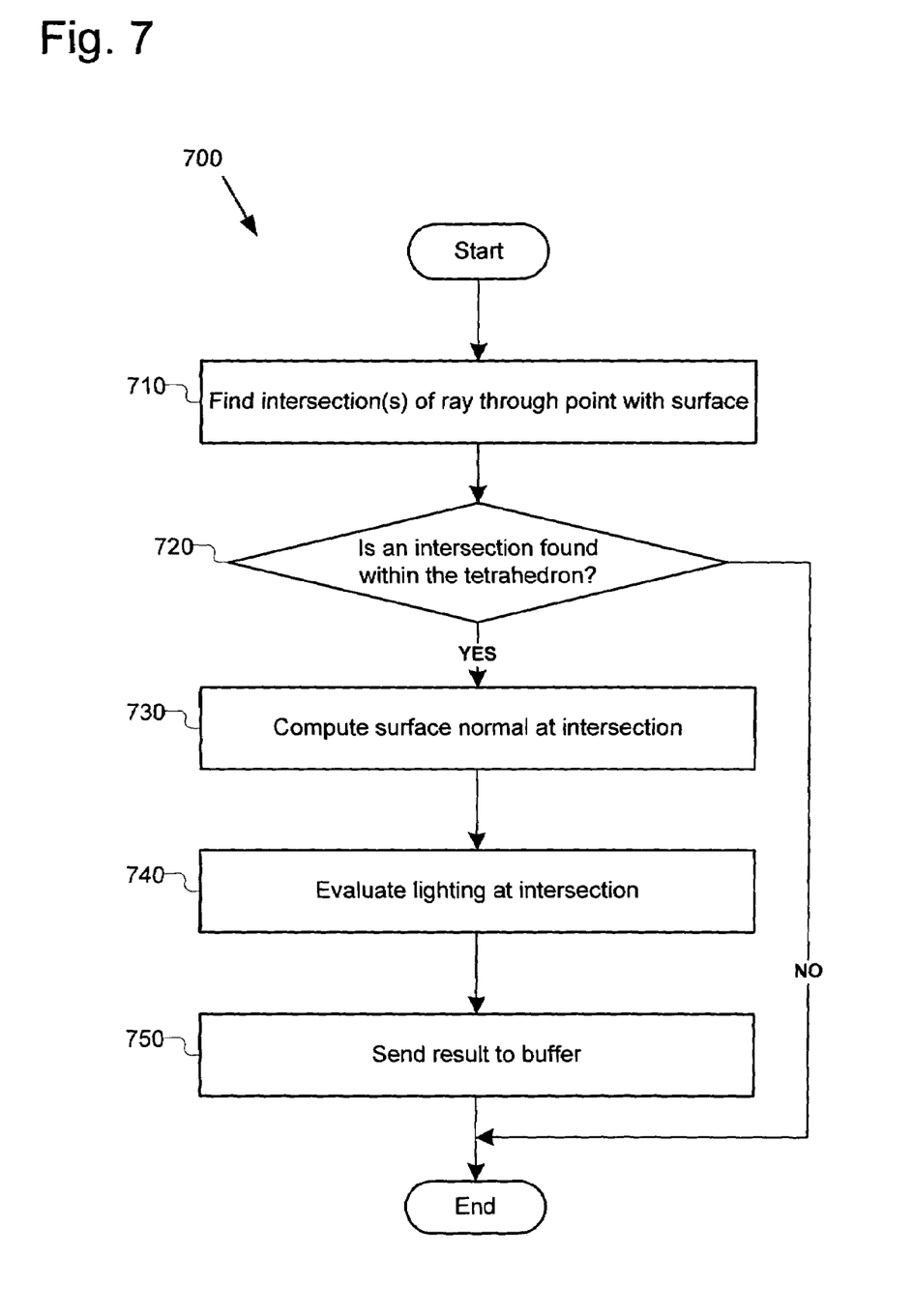
FIG. 7 is a flowchart illustrating an example process for rendering a point on a quadric surface.

FIG. 7 illustrates an example process 700 for rendering a point on a quadric surface. In various implementations, blocks of process 700 may be combined, subdivided, or rearranged; additionally, process 700 may be repeated for every point that is to be rendered through a viewing triangle. While in a preferred implementation process 700 may be performed by pixel shader units on a GPU, in alternative implementations different parts of the GPU may perform the process, or parts of the process may be performed by a CPU. Particular examples of implementations of the process of FIG. 7 will be described below.

Process 700 is performed for a chosen pixel in a triangle side of a tetrahedron. The process begins at block 710, where the GPU computes one or more intersections of a ray drawn through the triangle along the z-axis, to the surface defined by the Bézier tetrahedron chosen in process 500. In one implementation, his constitutes finding a z location given the x and y values of the pixel. Next, at decision block 720, the GPU determines if at least one of intersections is located within the bounding tetrahedron that was chosen. If it does not, the ray could be intersecting with the surface in another tetrahedron. Alternatively, the intersection may be in an unbounded portion of the surface, possibly one which is not being rendered. For example, if the surface was being viewed from inside, there may be intersection points behind the point of viewing, which would not be rendered. If no intersection is within the tetrahedron, the process ends and no point is rendered.

If there is an intersection within the tetrahedron, the process continues to block 730 where a surface normal is calculated in order to be used with a lighting evaluation. Next, at block 740, a lighting evaluation is performed using the computed surface normal. Finally, at block 750, the result of the lighting calculation, which is a combination of a color and a z-value, is sent to the buffer.

4. Examples of Surface-Rendering Implementations

In this section, particular examples of implementations of the rendering techniques described herein are discussed.

4.1 Examples of Intersection-Finding Implementations

In order to perform the process of block 710, the GPU must find intersections from a ray drawn through the pixel being rendered in the triangle to the surface bounded by the Bézier tetrahedron. Thus, for a given pixel (in homogenous form), the GPU knows $\tilde{x}$, $\tilde{y}$, and $\tilde{w}$, but it must determine $\tilde{z}$. If we solve for $\tilde{z}$ in Equation (4.1), the we have a quadratic polynomial $$a\tilde{z}^2 + 2b\tilde{z} + c = 0.$$

In one implementation, this polynomial can be solved in the process of block 710 using the quadratic formula $$\tilde{z} = \frac{-b \pm \sqrt{b^2 - 4ac}}{a}$$

to determine the roots $\tilde{z}$. If the discriminant $b^2 - ac$ is positive, there are two real roots. If it is zero there is one real (double) root, and if it is negative there two imaginary roots. Imaginary roots means that no part of the surface can be seen by the pixel, while a double root indicates that the pixel lies on the silhouette of the surface. Finally, two real roots mean that the ray hits the surface at two distinct points. Additional refinements to the root-finding implementation will be discussed below.

4.2 Examples of Perspective Transformation

For the sake of simplicity, the techniques described herein assume that a tetrahedron T has been transformed into an affine view space, with the eye point at the origin and viewing direction corresponding to the z axes. Assuming this, we can represent, by the matrix P, a perspective transformation that maps points in view space to projective screen space. The matrix P takes the pyramidal view frustum to a clipping cube.

Thus a view space point can be transformed to projective screen space by the taking the product $$\tilde{x} = xP$$

where $\tilde{x} = [\tilde{x}\ \tilde{y}\ \tilde{z}\ \tilde{w}]$. It follows that a quadric surface coefficient matrix is transformed from view space to projective screen space by $$\tilde{Q} = P^{-1}QP^{-T}.$$

This leads to a transformed surface:

$$\tilde{Q}(\tilde{x},\tilde{y},\tilde{z},\tilde{w}) = \tilde{x}\tilde{Q}\tilde{x}^{-T} = 0 \quad (4.1)$$

Thus, the implementations described herein will be with reference to points and values that have undergone a transformation via P. However, an additional issue complicates the selection of a P for each particular tetrahedron.

It is known that the perspective transform P, taking the viewing frustum bounded by near and far clipping planes to a canonical clipping cube, will redistribute z values resulting in precision loss. In the present case, this precision loss can manifest itself as pixel dropouts or cracks between adjacent tetrahedral elements. This is undesirable because proper rendering relies on smooth interactions between bounding tetrahedra to prevent a complex surface from being viewed as the composition of many parts. However, we can avoid this difficulty by a more judicious choice of perspective transform than the typical near/far clipping plane remapping.

A typical perspective matrix looks like:

$$P_d = \begin{bmatrix} \alpha & 0 & 0 & 0 \\ 0 & \beta & 0 & 0 \\ 0 & 0 & \frac{f}{f-n} & 1 \\ 0 & 0 & \frac{fn}{n-f} & 0 \end{bmatrix}$$

where $\alpha = \cot(\text{field\_of\_view}/2)$, $\beta = \text{aspect\_ratio}/\alpha$, and n and f are the near and far clipping plane distances. The subscript d in $P_d$ is used to indicate that this matrix is used take points from view space to projective screen space suitable for depth comparison.

This space provided by a typical perspective matrix is not well suited for accurately computing the roots that are needed in our rendering techniques described herein. The problem is that the maximum density of floating point z values resulting from $P_d$ does not, in general, occur over a useful range. For best results, we would like to get the most accuracy near the likely location of roots of the quadratic equations.

This can be achieved by using a specialized perspective matrix for each tetrahedron that remaps z values so that $\tilde{z}=0$ corresponds to a location that is likely to be close to where the roots (and thus the intersections with the surface) will be found. Since floating point numbers are usually more accurate near 0, this insures reasonable accuracy. In fact, all of the following pixel computations can be performed in this more accurate space, and the resulting $\tilde{z}$ value can be transformed back to the coordinate system needed for depth comparisons only when writing to the buffer. In one implementation this remapping is done simply by using a perspective matrix that maps $\tilde{z}=0$ to the centroid of a tetrahedron. In alternative implementations, different mappings may be used that provide for root-finding in a more accurate space.

This specialized perspective matrix takes the form $$P_t = \begin{bmatrix} \alpha & 0 & 0 & 0 \\ 0 & \beta & 0 & 0 \\ 0 & 0 & 1 & 1 \\ 0 & 0 & -\gamma & 0 \end{bmatrix}$$

where $\gamma$ is the z coordinate of the centroid of T in view space. In all following calculation implementations, $P_t$ is used as the perspective matrix.

When writing to the buffer, in order to find the correct $\tilde{z}$ value, the techniques must transform the intersection point back to view space using $P_t^{-1}$, and then transform the intersection to projective screen space using $P_d$. That is, we compose the matrices, arriving at:

$$P_t^{-1} P_d = \begin{bmatrix} 1 & 0 & 0 & 0 \\ 0 & 1 & 0 & 0 \\ 0 & 0 & \frac{fn}{\gamma(f-n)} & 0 \\ 0 & 0 & \frac{f(\gamma-n)}{\gamma(f-n)} & 1 \end{bmatrix}$$

Note that the transform represented by this matrix only affects $\tilde{z}$; so the transform back to projective screen space is simply $$\tilde{z}_d = \frac{f(\tilde{z}_t n + \tilde{w}_t(\gamma - n))}{\gamma(f-n)},$$

where $\tilde{z}_d$ is the depth in standard projective screen space, and $\tilde{z}_t$ and $\tilde{w}_t$ are the $\tilde{z}$ and $\tilde{w}$ components of a surface point in the locally more accurate projective space.

4.3 Examples of Exterior Culling

At the process of block 720, the GPU must make sure that the intersection point lies within the bounding tetrahedron. To do this, the GPU, in one implementation, finds the barycentric coordinates of the intersection point $\tilde{x}$ with respect to T by the product $$\alpha r = \tilde{x} P^{-1} T^{-1}. \qquad (4.2)$$

This is written herein as $\alpha r$ since the product with projective matrix P will only give the barycentric coordinates up to scale factor. Normalization is not a concern if it is noted that this point will be inside T if all the components of $\alpha r$ are positive.

4.4 Examples of Surface Normal Implementations

In the process of block 730, in order to find a surface normal to use in lighting calculations, in one implementation the GPU takes the gradient of Q from Equation (4.1) above:

$$\nabla \tilde{Q}(\tilde{x}, \tilde{y}, \tilde{z}, \tilde{w}) = \begin{bmatrix} \frac{\partial \tilde{Q}}{\partial \tilde{x}} & \frac{\partial \tilde{Q}}{\partial \tilde{y}} & \frac{\partial \tilde{Q}}{\partial \tilde{z}} & \frac{\partial \tilde{Q}}{\partial \tilde{w}} \end{bmatrix}.$$

This gradient represents a plane tangent to the surface at point $\tilde{x}$. The plane can be found in one implementation by the product:

$$\frac{1}{2} \nabla \tilde{Q} = \tilde{Q} \tilde{x}^T$$

In a preferred implementation, the GPU must also transform the plane back to view space for lighting. This can be accomplished by $$n = PQ\tilde{x}^T$$

where n represents a scale invariant tangent plane. The GPU then normalizes the vector containing the first three components to get the surface normal. After that calculation, standard lighting evaluations can be performed in the process of block 740.

5. Examples of GPU Calculation Implementations

While the examples given in Section 4 above describe implementations of broad calculations to be used when rendering points, additional refinements can be made in order to fully take advantage of the interpolation abilities and calculation strengths of a GPU.

In one implementation, the vertex data sent to the vertex shader units of the GPU for each of the four triangles of a tetrahedron consists of the following:

$$\{v_i, Q, T^{-1}\}$$

where $v_i$ are the vertex coordinates for the triangle, Q is the quadric coefficient matrix computed from the Bézier weight matrix B using Equation (3.3), and $T^{-1}$, which is needed to determine if a point lies inside the bounding tetrahedron using Equation (4.2). In one implementation, only the 10 unique coefficients of Q are included, avoiding redundancy. In various implementation, it can also be assumed that transformation matrices P and $P^{-1}$, as well any other pre-perspective transformation matrices, are available to shader programs as global variables.

Using these input values, the GPU can execute a vertex shader program which transforms the vertex data to projective screen space, and computes quantities to be input to a pixel shader. One of the fundamental operations of the GPU is to linearly interpolate data, output from a vertex shader, over the pixel centers contained within a triangle. In the following implementation examples, this ability of the GPU is leveraged to increase computational efficiency.

5.1 Examples of Root-Solving Implementations

As discussed above, For a given pixel $[\tilde{x}/\tilde{w} \ \tilde{y}/\tilde{w}]$, the GPU must determine the coefficients of the polynomial $$a\tilde{z}^2 + 2b\tilde{z} + c = \tilde{x} \tilde{Q} \tilde{x}^T \qquad (5.1)$$

and then solve for $\tilde{z}$ using the implementation outlined in Section 4.5. In order to make this computation more efficient, for the purposes of description we define $\bar{v}_i = [\tilde{x} \ \tilde{y} \ 0 \ \tilde{w}]$ to be the screen space projection of $v_i$ (with $\tilde{z}=0$) so that $$\bar{x} = [\tilde{x} \ \tilde{y} \ 0 \ \tilde{w}]$$

is the projective coordinates of a pixel, interpolated by the GPU. The coefficients a, b, and c can be found as $$a = \tilde{q}_{22},$$

$$b = \bar{x} \cdot [\tilde{q}_{02} \ \tilde{q}_{12} \ \tilde{q}_{22} \ \tilde{q}_{23}],$$

$$c = \bar{x} \tilde{Q} \bar{x}^T.$$

The coefficient a does not depend on pixel location and will stay constant over an entire triangle. The coefficient b will change linearly over a triangle. Therefore, if we calculate the b coefficient value corresponding to $\bar{v}_i$ in the vertex shader program, then the b coefficient value interpolated by the GPU over each triangle will be the correct b coefficient value of the corresponding pixel.

However, the coefficient c changes quadratically from pixel to pixel. Because rasterization hardware does not typically perform quadratic interpolation, c cannot be directly interpolated. However, the vector $\bar{x}Q$ does change linearly. The GPU can thus take the dot product $q_0 = \bar{v}_i Q$ in a vertex shader program and pass the result to the pixel shader. This vector value will be interpolated over a triangle so that the GPU can compute $c = q_0 \bar{x}^T$ in the pixel shader, to get the correct c coefficient value of that pixel. Note that the third component of $q_0$, or $\tilde{z}$, is equal to b, so the interpolation to get b and c are combined.

Thus, to determine the coefficients in Equation (5.1), the GPU need only to interpolate the vectors $\bar{x}$ and $q_0$, and the scalar value $q_{22}$. Additionally efficiencies arise because the implementations described herein reuse and add to these values for computing the normal vector at the point of intersection.

5.2 Examples of Tetrahedron Clipping Implementations

The next part of the rendering calculations involving the clipping of the quadric surface against a bounding tetrahedron are achieved by decomposing the product $$\alpha r = \tilde{x}(P^{-1}T^{-1})$$
$$= t_0 + \tilde{z}t_1,$$

where $t_0$ is an interpolation of $\bar{v}_i(P^{-1}T^{-1})$, and $t_1$ is the third row of the matrix $(P^{-1}T^{-1})$. Even though the vector $t_1$ will be constant over a triangle, in one implementation it is still interpolated due to hardware restrictions in order to be available in the pixel shader.

5.3 Examples of Normal Computation Implementations

In one implementation, to compute the surface normal in the process of block 730, the GPU finds the tangent plane as follows:

$$\tilde{Q}\tilde{x}^T = (\bar{x}\tilde{Q} + [0 \quad 0 \quad \tilde{z} \quad 0]\tilde{Q})^T,$$
$$= q_0 + \tilde{z}q_1,$$

where $q_1$ is the third row of $\tilde{Q}$. Note that the third component of $q_1$ is $q_{22}$, so we don't need to separately interpolate a across a triangle.

5.4 Example Processes of GPU Computation

As the examples of Section 5 show, in one implementation all calculations needed to render a bounded second order surface, solving for $\tilde{z}$, computing a normal vector, and determining if a solution lies within the bounding tetrahedron can be done by interpolating the three linearly varying vectors $\bar{x}$, $q_0$, and $t_0$, and the two constant vectors $q_1$ and $t_1$.

Figure 8:
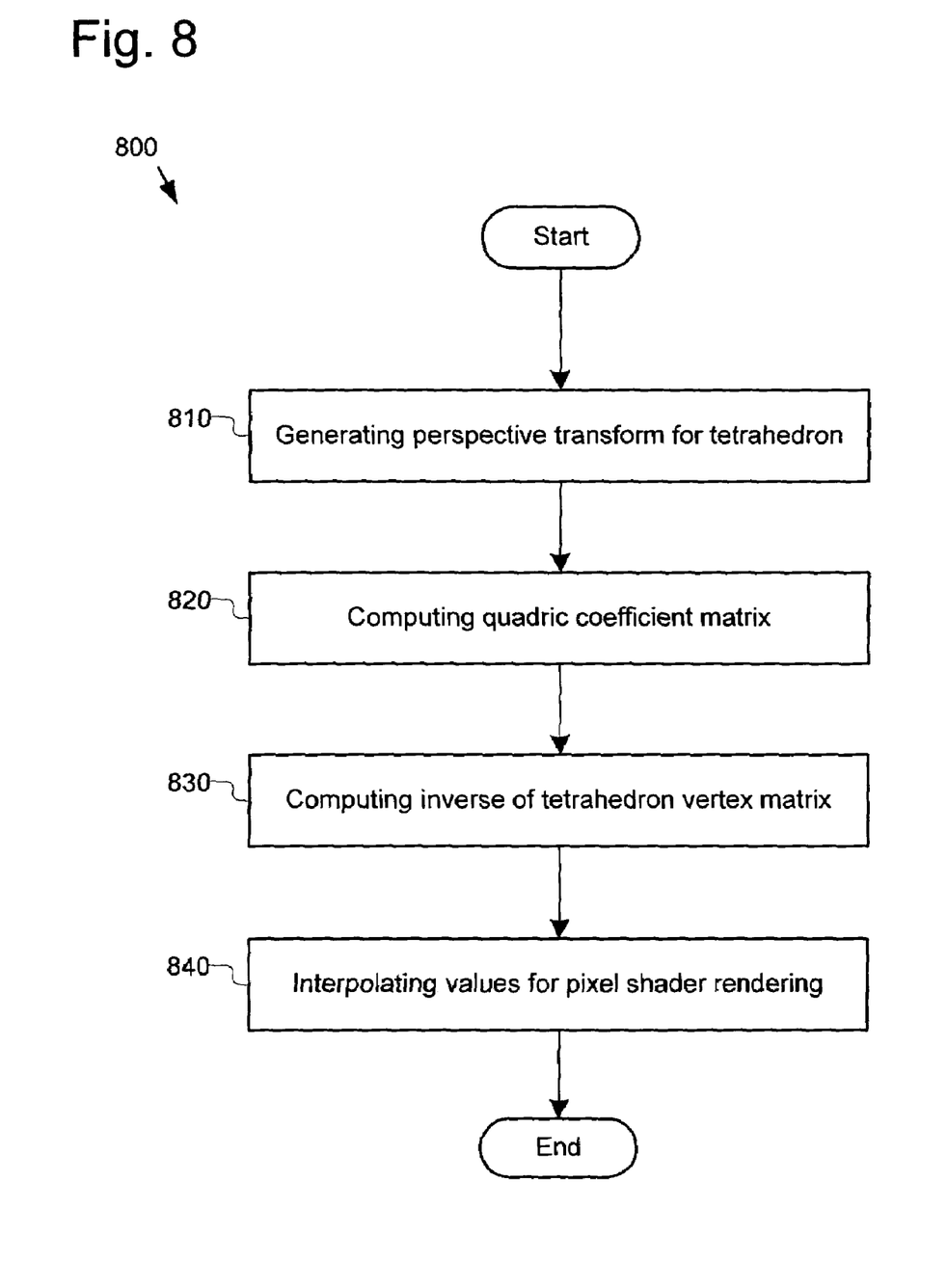
FIG. 8 is a flowchart illustrating an example process for preparing values for point rendering.

FIG. 8 illustrates an example process 800 for preparing values for rendering computation on a pixel shader. In various implementations, blocks of process 800 may be combined, subdivided, or rearranged; additionally, process 800 may be repeated for every point that is to be rendered through a viewing triangle. While in one implementation process 800 may be performed by a combination of a GPU and a CPU, in alternative implementations vertex shader units of the GPU, or a combination of vertex shader units and a rasterizer, may perform the process. The process begins at block 810, where a perspective transform is generated for the tetrahedron which bounds the surface being rendered. Various perspective transform implementations are described above in Section 4.1 Next, at block 820, the quadric coefficient matrix Q is computed. In one implementation, this is performed using the Bézier weight matrix B and Equation (3.3). Next, at block 830, the inverse of the tetrahedron vertex matrix T is computed. As mentioned above at the beginning of the present section, the results of these processes, along with the vertices of whichever triangle is being used as a viewing triangle for the rendering process provide the input values $v_i$, Q, and $T^{-1}$. Next, at block 840, these input values are used to interpolate the values needed by the pixel shader units to render the bounded surface.

Figure 9:
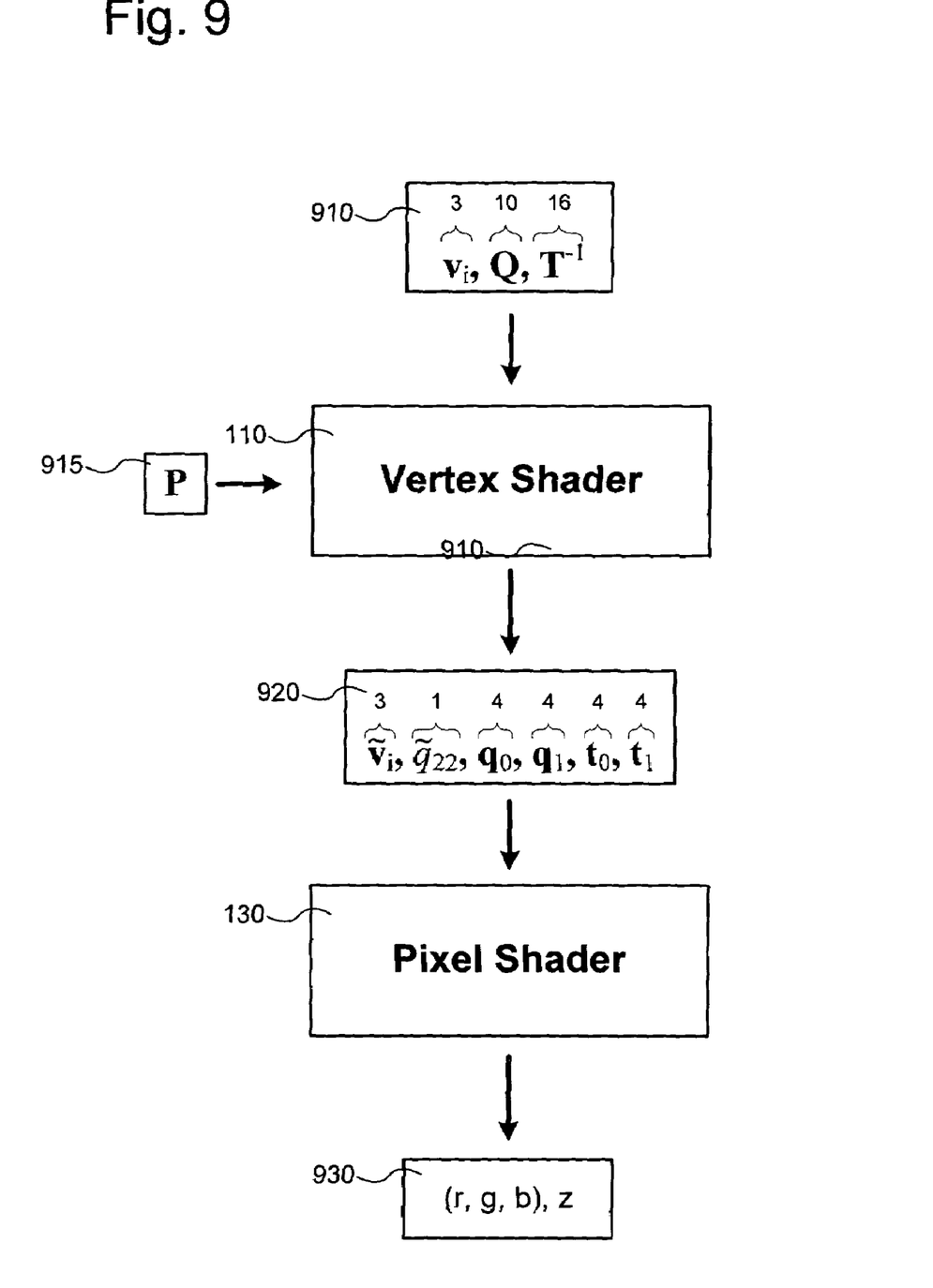
FIG. 9 is a block diagram of an example data flow during rendering.

FIG. 9 is a block diagram illustrating the flow of data into and out of the GPU. Note that while FIG. 9 only shows a "vertex shader" 110 and a "pixel shader" 130, these merely represent simplifications of the vertex shader units and pixel shader units of FIG. 1 for the purposes of illustration. Also, for the purposes of simple illustration, other GPU components, in particular the rasterizer and the buffer, are also not listed.

FIG. 9 illustrates that the input to the vertex shader 110 is a set of values 910 comprising $v_i$, Q, and $T^{-1}$. As mentioned above, these are, in one implementation, the only local values required for the computation. FIG. 9 also illustrates that P, a perspective transform value 915, is input, typically as a global variable. After the vertex shader (and/or rasterizer) completes interpolation of the values according to the implementations described above, a set of values 920 is produced for computation by the pixel shader. These values again represent the minimal values needed in one implementation of the present techniques to allow the pixel shader 130 to render the surface. As illustrated in FIG. 9, they are $\tilde{v}_i$, $\tilde{q}_{22}$, $q_0$, $q_1$, $t_0$, and $t_1$. These values are then utilized according to the processes and implementations described above to generate a pixel value 930, which consists, in one implementation of an (r, g, b) color value as well as a z value. This pixel value can then be sent to a buffer.

6. Additional Examples of Intersection-Finding Implementations

Using the quadratic formula alone in the process of block 710 proves problematic in certain cases. The first occurs where $b^2 \square ac$ so that $\sqrt{b^2 - ac} \approx b$. This happens when one of the two roots is very much smaller (in magnitude) than the other. If b is positive, calculating the smaller of the roots requires evaluating $-b + \sqrt{b^2 - ac}$. This results in subtraction of two nearly equal quantities, and can thus cause computation problems due to numerical error. Likewise, if b is negative, computation of the other root will have problems. This can be especially problematic in process 700 because it is likely that the smaller of the roots is the one that lies within the defining tetrahedron in projective screen space (which case is tested for in the process of block 720). One solution to this problem is to note that the product of the two roots is $\tilde{z}_1 \tilde{z}_2 = c/a$. This means that after calculating the numerically stable root we can get the other root by the numerically stable division $\tilde{z}_2 = c/(a\tilde{z}_1)$. Another way of expressing these relations is $$h = -(b + sgn(b)\sqrt{b^2 - 4ac})$$

$$\tilde{z}_1 = h/a$$

$$\tilde{z}_2 = c/h.$$

However, it is not ideal for the GPU to determine the roots through these equations when rendering graphics and animation because as b smoothly transitions from negative to positive the two roots will swap roles. That is, the larger of the two roots jumps abruptly from being $\tilde{z}_1$ to being $\tilde{z}_2$, or vice versa. For this reason, the implementation described above can be further refined as follows:

If (b<0), use the relation:

$$h = -b + \sqrt{b^2 - 4ac}$$

$$\tilde{z}_1 = h/a$$

$$\tilde{z}_2 = c/h,$$

otherwise, use:

$$h = -b - \sqrt{b^2 - 4ac}$$

$$\tilde{z}_1 = c/h$$

$$\tilde{z}_2 = h/a.$$

This implementation guarantees that $\tilde{z}_2 < \tilde{z}_1$.

A second numerical problem happens when z=0. Conventionally this means that the quadratic degenerates into a linear equation that represents a plane. In projective geometry, however, it means that one of the roots of the quadratic is at infinity. This is a possible situation and should ideally be taken into account in an implementation of the process of block 710.

This problem can be dealt with by considering the quadratic as a homogeneous system:

$$as^2 + 2bst + ct^2 = 0$$

where $\tilde{z} = s/t$ for nonzero t. Thus, instead of solving for $\tilde{z}$, the GPU solves for the pair (s,t). This effectively defers the division for later. The GPU can then test each solution against the tetrahedron by changing the calculation $t_0 = \tilde{z}t_1$ to the homogeneous form $tt_0 = st_1$. Sign must be also taken into account, however. The original calculation was designed to give four positive barycentric coordinates for points inside the tetrahedron. The homogeneous implementation effectively calculates $t(t_0 = \tilde{z}t_1)$. This means that we want the t component of each solution pair to be positive to avoid a spurious sign flip. This is possible since each homogeneous solution pair can be expressed as either (s,t) or (−s,−t). This is made a bit easier if we first ensure a>0 by a global sign flip of a, b, and c whenever a<0, which does not change the location or ordering of the roots. Putting these modifications together with the earlier implementation details arrives at the following homogeneous algorithm:

If (b<0), use the relation:

$$h = -b + \sqrt{b^2 - 4ac}$$

$$(s,t)_1 = (h,a)$$

$$(s,t)_2 = (c,h),$$

otherwise, use:

$$h = b + \sqrt{b^2 - 4ac}$$

$$(s,t)_1 = (-c,h)$$

$$(s,t)_2 = (-h,a),$$

In each of the cases above, the implementation described keeps h as a positive value. Therefore the t values are positive. Once an (s,t) pair passes the $tt_0 + st_1 > 0$ test it is known that the solution lies inside the tetrahedron and it is safe to divide to compute $\tilde{z} = s/t$. This process is very reminiscent of homogeneous clipping against the screen boundaries.

There is a third case to consider. It is possible to have either a=b=0, or b=c=0. In both these cases the quadratic equation has a double root, either at $\tilde{z} = 0$ in the first case, or at $\tilde{z} = \infty$ in the second. The implementation as described above will find the appropriate double root for one of the (s,t) pairs but will generate (0, 0) for the other pair. A modification to the implementation to properly handle these cases involves another else clause for the case b=0 and looks like the following:

If (b<0), use the relation:

$$h = -b + \sqrt{b^2 - 4ac}$$

$$(s,t)_1 = (h,a)$$

$$(s,t)_2 = (c,h),$$

else, if (b>0), use:

$$h = b + \sqrt{b^2 - 4ac}$$

$$(s,t)_1 = (-c,h)$$

$$(s,t)_2 = (-h,a),$$

else, use:

$$\begin{cases} h = \sqrt{-ac} & \\ \text{if } (a > |c|), & \\ & (s,t)_1 = (h,a) \\ & (s,t)_2 = (-h,a) \\ \text{else,} & \\ & (s,t)_1 = (-c,h) \\ & (s,t)_2 = (c,h), \end{cases}$$

7. Example Implementations for Rendering Degenerate Quadric Surfaces

For a particular choice of weights, a Bézier tetrahedron might generate a singular matrix for Q. Matrices of rank 3 will generate shapes such as cylinders and cones. Matrices of rank 2 will generate pairs of distinct but intersecting planes (or occasionally quadrics that are satisfied by only a single-point). All these shapes are handled properly by the processes and implementations described above. Matrices of rank 1, however, pose additional difficulties serious problem for two reasons. First, such matrices geometrically represent double planes; they are the square of the equation of a single plane. This means that any ray cast through such a shape will have a double root at the shape and the discriminant computed during processing will show $b^2 - ac = 0$ over the entire shape. While numerical inaccuracies will cause this quantity to have various very small positive and negative values, this quantity is what the above implementations use to determine visibility of a pixel with respect to silhouette edges. This works for higher rank matrices, but can generate noise for a rank 1 matrix if special measures are not taken The second problem is that, the above-discussed computation implementations of surface normals does not work for rank 1 matrices. This is because the gradient of the square of a plane equation is equal to the plane equation itself. That means that evaluating this gradient at any point on the surface yields a vector of [0,0,0,0]. For this reason, it is undesirable to directly render rank 1 quadric surfaces using the processes described herein. However, if such a surface is in a model it can be easily rendered as a rank 2 surface by multiplying the desired plane equation by the plane at infinity. Any points on this extraneous plane will not lie inside the modeling tetrahedron and so will not affect the appearance of the image. In one implementation, this can be done as a preprocess on the CPU before submitting such a shape for rendering.

8. Examples of Anti-Aliasing Implementations

In various implementations, the techniques described here handle the problem of anti-aliasing. Within a single tetrahedra, it is possible (using gradients) to determine the distance to a silhouette edge, which is the second order curve represented by the discriminant $b^2-ac=0$. If the distance from a pixel center to this curve is less than 1, in one implementation, the GPU can reduce the opacity of the pixel's color accordingly and blend against the background color. A similar effect is possible with edges bounded by tetrahedron faces. Unfortunately, this does not work correctly with unordered triangles from multiple tetrahedra using a buffer; this is a familiar problem encountered with transparency in a buffer. One solution is to sort triangles and render them in back to front order. Given that the number of triangles is small relative to the fidelity of the surface, this can be a practical solution.

9. Computing Environment

The above described surface-rendering techniques can be performed on any of a variety of devices in which digital media signal processing is performed, including among other examples, computers; image and video recording, transmission and receiving equipment; portable video players; video conferencing; and etc. The techniques can be implemented in hardware circuitry, as well as in digital media processing software executing within a computer or other computing environment, such as shown in FIG. 10.

Figure 10:
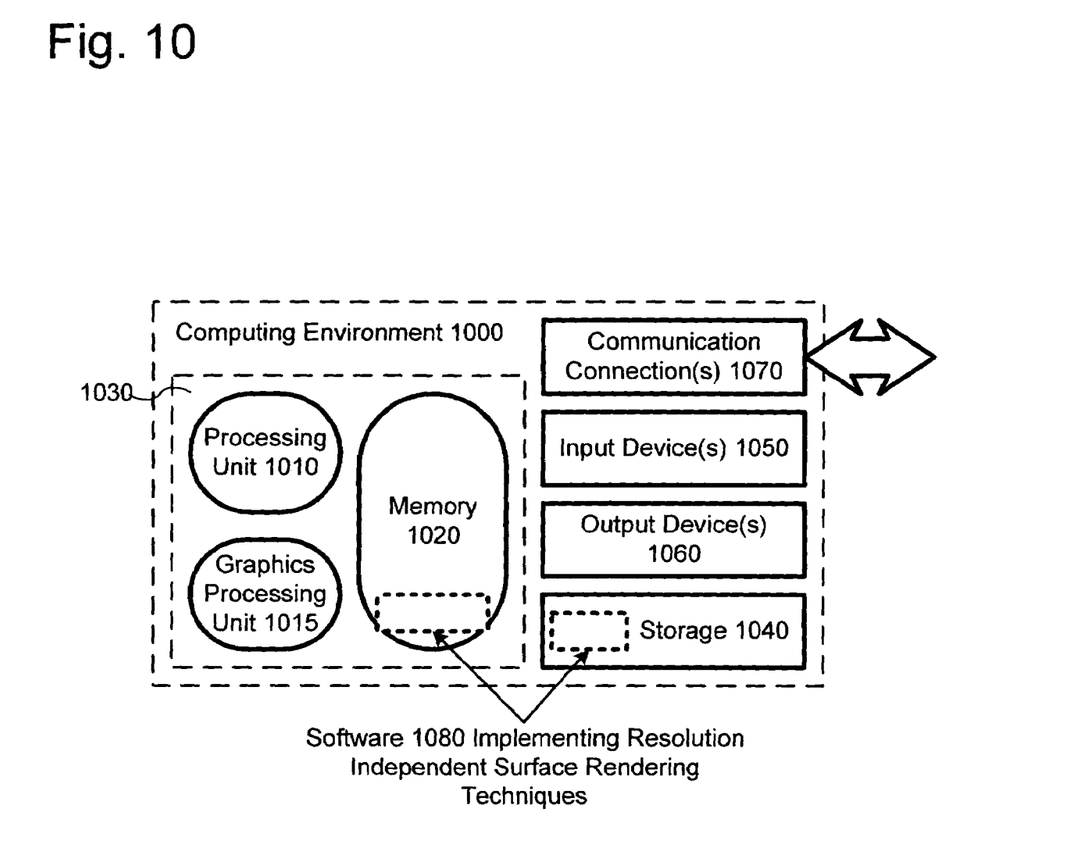
FIG. 10 is a block diagram of a suitable computing environment for implementing the rendering techniques of FIG. 5.

FIG. 10 illustrates a generalized example of a suitable computing environment (1000) in which described embodiments may be implemented. The computing environment (1000) is not intended to suggest any limitation as to scope of use or functionality of the invention, as the present invention may be implemented in diverse general-purpose or special-purpose computing environments.

With reference to FIG. 10, the computing environment (1000) includes at least one processing unit (1010), a GPU (1015), and memory (1020). In FIG. 10, this most basic configuration (1030) is included within a dashed line. The processing unit (1010) executes computer-executable instructions and may be a real or a virtual processor. In a multi-processing system, multiple processing units execute computer-executable instructions to increase processing power. The memory (1020) may be volatile memory (e.g., registers, cache, RAM), non-volatile memory (e.g., ROM, EEPROM, flash memory, etc.), or some combination of the two. The memory (1020) stores software 1080 implementing the described encoder/decoder and efficient transform coefficient encoding/decoding techniques. The GPU (1015) may be integrated with the processing unit 1010 on a single board or may be contained separately. In one implementation, the GPU (1015) has architecture as illustrated in FIG. 1.

A computing environment may have additional features. For example, the computing environment (1000) includes storage (1040), one or more input devices (1050), one or more output devices (1060), and one or more communication connections (1070). An interconnection mechanism (not shown) such as a bus, controller, or network interconnects the components of the computing environment (1000). Typically, operating system software (not shown) provides an operating environment for other software executing in the computing environment (1000), and coordinates activities of the components of the computing environment (1000).

The storage (1040) may be removable or non-removable, and includes magnetic disks, magnetic tapes or cassettes, CD-ROMs, CD-RWs, DVDs, or any other medium which can be used to store information and which can be accessed within the computing environment (1000). The storage (1040) stores instructions for the software (12080) implementing the described surface-rendering techniques.

The input device(s) (1050) may be a touch input device such as a keyboard, mouse, pen, or trackball, a voice input device, a scanning device, or another device that provides input to the computing environment (1000). For audio, the input device(s) (1050) may be a sound card or similar device that accepts audio input in analog or digital form, or a CD-ROM reader that provides audio samples to the computing environment. The output device(s) (1060) may be a display, printer, speaker, CD-writer, or another device that provides output from the computing environment (1200).

The communication connection(s) (1070) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The surface-rendering techniques herein can be described in the general context of computer-readable media. Computer-readable memory or storage are any available media that can be accessed within a computing environment. By way of example, and not limitation, with the computing environment (1000), computer-readable media include memory (1020), storage (1040), communication media, and combinations of any of the above.

The surface-rendering techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "interpolate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of rendering an image containing a view of a surface, the surface comprising one or more Bézier tetrahedra and each of the one or more Bézier tetrahedra comprising four triangles, the method comprising:
   for each tetrahedron of the one or more Bézier tetrahedra, rendering a portion of the surface by computing pixel values for points on the portion of the surface seen through one or more viewing triangles selected from the four triangles constituting the tetrahedron; and
   producing the image including the surface.

2. The method of claim 1, wherein the one or more viewing triangles are selected to be those triangles which are visible.

3. The method of claim 1, wherein the computing the pixel values for points on the portion of the surface seen through the one or more viewing triangles comprises:
   selecting a viewing triangle of the one or more viewing triangles;
   interpolating values which can be used to compute the pixel values as corresponding to the points in the portion of the surface;
   computing the pixel values for the portion of the surface using the interpolated data.

4. The method of claim 3, wherein interpolating values comprises utilizing a graphics processing unit to interpolate values.

5. The method of claim 4, wherein interpolating values comprises inputting vertices for the triangle, along with a quadric coefficient matrix and an inverse of a tetrahedron matrix.

6. The method of claim 3, wherein the computing the pixel values comprises rendering the points in the portion of the surface on one or more pixel shaders.

7. The method of claim 3, wherein the interpolated values are based at least in part on values interpolated within the selected viewing triangle.

8. The method of claim 7, wherein computing pixel values for the portion of the surface using the interpolated data comprises, for each value interpolated with the selected viewing triangle:
   extending a ray from an eye point through the interpolated value;
   computing an intersection point on the surface which is located at an intersection of the ray extended to the surface;
   testing to determine if the intersection point on the surface is located within the tetrahedron;
   if the intersection point is within the tetrahedron, computing a normal to the surface at the intersection point on the surface; and
   performing a lighting evaluation at the intersection point using the normal to generate a pixel value for the intersection point.

9. The method of claim 8, wherein computing an intersection point on the surface which is located at an intersection of a ray comprises determining, for given interpolated x and y values within the selected viewing triangle, the z value where the intersection point lies.

10. The method of claim 8, wherein computations utilized in rendering are modified by a perspective transformation.

11. The method of claim 10, wherein the perspective transformation is generated such that the z-axis during rendering is equal to zero at a location that is likely to be close to where one or more intersections can be found.

12. A method of drawing a section of a surface, the surface defined within a tetrahedron by quadric Bézier weights, the method comprising:
   determining a quadric coefficient matrix describing the surface within the tetrahedron;
   determining vertices of a triangle which constitutes a side of the tetrahedron and which covers, at least in part, the section of the surface;
   interpolating values based on the vertices, the quadric coefficient matrix, and the tetrahedron; and
   drawing pixels within the section using the interpolated values.

13. The method of claim 12, further comprising repeating the process for one or more other triangles constituting sides of the tetrahedron in order to render the surface.

14. The method of claim 13, further comprising:
   partitioning a complex surface, the complex surface comprising a plurality of quadric surfaces, into a plurality of surfaces each defined within a tetrahedron by quadric Bézier weights; and
   repeating the process for each of the plurality of surfaces in order to render the complex surface.

15. The method of claim 12, wherein:
   the interpolating values is performed by a graphics processing unit after execution of one or more vertex shaders in the graphics processing unit on the vertices; and
   the drawing pixels is performed by the graphics processing unit after rendering of the pixels by one or more pixel shaders in the graphics processing unit.

16. The method of claim 12, wherein the interpolated values are based on interpolated locations within the triangle.

17. One or more computer-readable media containing machine-executable instructions which describe a method for rendering an image containing a view of a quadric surface, the quadric surface being described by one or more Bézier tetrahedra and each of the one or more Bézier tetrahedra being composed of four triangles, the method comprising:
   for each of one or more of the triangles, choosing a series of points in the triangle;
   for each point chosen, the point lying in a viewing triangle:
      extending a ray through the point;
      computing an intersection point on the surface which is located at an intersection of the ray extended through the intersection point with the surface;
      determining if the intersection point on the surface is inside the tetrahedron containing the viewing triangle;
      computing a surface normal at the intersection to use in a lighting evaluation; and
      performing the lighting evaluation based on the surface normal; and producing the image.

18. The computer-readable media of claim 17, wherein choosing a series of points in the triangle comprises utilizing one or more vertex shaders to interpolate points within the triangle.

19. The computer-readable media of claim 17, wherein computations performed for each point chosen are performed by one or more pixel shaders.

20. The computer-readable media of claim 17, wherein computations performed for each point are modified by a perspective transform.

* * * * *